United States Patent [19]

Pecoraro

[11] Patent Number: 5,071,806

[45] Date of Patent: * Dec. 10, 1991

[54] VANADIUM TOLERANT CRACKING CATALYST

[75] Inventor: Theresa A. Pecoraro, Danville, Calif.

[73] Assignee: Chevron Research and Technology Company, San Francisco, Calif.

[*] Notice: The portion of the term of this patent subsequent to Mar. 19, 2008 has been disclaimed.

[21] Appl. No.: 499,140

[22] Filed: Mar. 27, 1990

Related U.S. Application Data

[63] Continuation-in-part of Ser. No. 252,236, Sep. 30, 1988, abandoned, and a continuation-in-part of Ser. No. 440,556, Nov. 22, 1989, Pat. No. 4,988,659, which is a continuation-in-part of Ser. No. 275,470, Nov. 23, 1988, abandoned.

[51] Int. Cl.$^5$ .................. B01J 21/16; B01J 29/06
[52] U.S. Cl. .................. 502/68; 502/65
[58] Field of Search .............. 502/68, 235, 521, 65

[56] References Cited

U.S. PATENT DOCUMENTS

| | | | |
|---|---|---|---|
| 2,548,860 | 4/1951 | Bond, Jr. | 208/120 |
| 2,565,886 | 8/1951 | Ryland | 502/235 |
| 2,782,144 | 2/1957 | Pardee | 208/120 |
| 3,140,249 | 7/1964 | Plank et al. | 208/120 |
| 3,271,418 | 9/1966 | Plank et al. | 208/120 |
| 3,352,796 | 11/1967 | Kimberlin, Jr. et al. | 252/455 |
| 3,449,265 | 6/1969 | Gladrow et al. | 252/455 |
| 3,553,104 | 1/1971 | Stover et al. | 208/120 |
| 3,558,476 | 1/1971 | Robbins, Jr. et al. | 208/120 |
| 3,830,725 | 8/1974 | Dolbear et al. | 208/120 |
| 3,867,308 | 2/1975 | Elliott, Jr. | 252/455 Z |
| 3,867,310 | 2/1975 | Elliott, Jr. | 252/455 Z |
| 3,929,621 | 12/1975 | Lussier et al. | 208/120 |
| 3,994,800 | 11/1976 | Lussier et al. | 208/120 |
| 4,198,319 | 4/1980 | Alafandi et al. | 252/455 Z |
| 4,226,743 | 10/1980 | Seese et al. | 252/453 |
| 4,259,212 | 3/1981 | Gladrow et al. | 252/455 |
| 4,266,672 | 5/1981 | Van Nordstrand | 208/120 |
| 4,289,653 | 9/1981 | Jaffe | 252/453 |
| 4,292,169 | 9/1981 | Gladrow | 208/120 |
| 4,310,441 | 1/1982 | Alafandi et al. | 252/453 |
| 4,357,265 | 11/1982 | Chiang | 252/455 Z |
| 4,451,355 | 5/1984 | Mitchell et al. | 208/113 |
| 4,465,588 | 8/1984 | Occelli et al. | 208/120 |
| 4,465,779 | 8/1984 | Occelli et al. | 502/63 |
| 4,480,047 | 10/1984 | Beck et al. | 502/65 |
| 4,499,197 | 2/1985 | Seese et al. | 502/65 |
| 4,519,897 | 5/1985 | De Jong | 208/74 |
| 4,520,120 | 5/1985 | Mitchell et al. | 502/68 |
| 4,617,108 | 10/1986 | Shyr et al. | 208/120 |
| 4,707,461 | 11/1987 | Mitchell et al. | 502/64 |
| 4,920,087 | 4/1990 | Wormsbecher | 502/68 |

OTHER PUBLICATIONS

Differences Between Silica and Silica-Alumina Gels II. A Proposed Mechanism for the Gelation and Syneresis of these Gels, C. J. Plank, from Socony-Vacuum Laboratories Research and Development Dept., Paulsboro, N.J. (Revised 7-9-47), pp. 413-427.

Prediction of Cracking Catalyst Behavior by a Zeolite Unit Cell Size Model, L. A. Pine, P. J. Maher, and W. A. Wachter, Exxon Research & Development Laboratories, Journal of Catalysis 85, 466-476 (1984).

Differences Between Silica and Silica-Alumina Gels I. Factors Affecting the Porous Structure of these Gels, C. J. Plank and L. C. Drake, from Socony-Vacuum Laboratories, pp. 399-412).

*Primary Examiner*—Carl F. Dees

[57] ABSTRACT

A composition for the catalytic cracking of a high metals content hydrocarbonaceous feedstock is disclosed, the catalyst comprising a magnesium-containing clay material, a silica-alumina cogel, and zeolite.

37 Claims, No Drawings

VANADIUM TOLERANT CRACKING CATALYST

CROSS REFERENCE TO RELATED APPLICATION

This application is a continuation-in-part of application Ser. No. 252,236, filed Sept. 30, 1988 (now abandoned); and is also a continuation-in-part of U.S. Pat. application Ser. No. 440,556 filed Nov. 22, 1989 now U.S. Pat. No. 4,988,659 which in turn is a continuation-in-part- of U.S. Pat. application Ser. No. 275,470, filed Nov. 23, 1988 (now abandoned).

BACKGROUND OF THE INVENTION

This invention relates to novel hydrocarbon conversion catalysts, methods for their preparation, and use thereof in hydrocarbon conversion processes. More particularly, the present invention relates to a catalytic cracking catalyst suitable for the conversion of heavy hydrocarbon feeds, for example residua, which catalyst is tolerant of contaminating metals often found in such feeds.

The refining industry today emphasizes not only the gasoline yield of a hydroconversion process, but also the gasoline quality obtainable by that process, particularly its octane. In the United States, the fluid catalytic cracking (FCC) process provides about 35% of the gasoline pool. Consequently, refiners are very interested in boosting the octane of the product coming from these type units. Several factors affect the gasoline yield and quality produced by an FCC unit. Feedstock type, catalyst type, and process variables, in particular, temperature and pressure, are among the major factors affecting octane of the gasoline.

Catalytic cracking systems ordinarily employ catalyst in a moving or fluidized bed. Catalytic cracking is also carried out in the absence of externally supplied molecular hydrogen, and is, for that reason, distinctly different from hydrocracking, in which molecular hydrogen is added in processing. In catalytic cracking, an inventory of particulate of particulate catalyst is continuously cycled between a cracking reactor and a catalyst regenerator. In a fluidized catalytic cracking (FCC) system, a stream of hydrocarbon feed is contacted with fluidized catalyst particles in a hydrocarbon cracking zone, or reactor, at a temperature of about 425°-600° C. The reactions of hydrocarbons in the hydrocarbon stream at the elevated operating temperature result in deposition of carbonaceous coke on the catalyst particles. The resulting hydrocarbon products are separated from the coke-deactivated, spent catalyst and are withdrawn from the reactor. The coked catalyst particles are stripped of volatiles, usually by means of steam, and passed to the catalyst regeneration zone. In the catalyst regenerator, the coked catalyst is contacted with oxygen. The coke is burned off the catalyst, restoring catalytic activity and simultaneously heating the catalyst to between 540° and 815° C. Flue gas formed by combustion of coke in the catalyst regenerator may be treated for removal of particulates and conversion of carbon monoxide, after which it is normally discharged into the atmosphere.

In ordinary catalytic cracking processes, various metallic contaminants which may be present in the hydrocarbonaceous feedstock, particularly vanadium, nickel and iron, cause the degradation and/or deactivation of the catalytic cracking catalyst. Particularly susceptible to vanadium contamination are crystalline aluminosilicate zeolites, either natural or synthetic. This deactivation causes distillate yield loss, particularly through loss of active acid cracking sites, as well as metal poisoning via secondary dehydrogenation and coking reactions caused by the deposition of these heavy metals on the catalyst. Remedial technology has evolved in various ways to deal with this metals-contaminant problem. One mechanism which has evolved includes the use of various diluents as metals passivators or traps, which contain materials which will chemically combine with and effectively tie up the offending materials. These traps have proved particularly effective with regard to vanadium. These traps may be present on a single particle with the cracking catalyst or they may be employed on a separate discrete component of a dual particle catalyst system.

In general, then, prior art zeolite catalysts show a tremendous activity advantage, and good gasoline selectivity. Unfortunately, they continue to demonstrate higher hydrogen-transfer activity which reduces the olefinic character of this gasoline, thereby reducing the octane rating. They are also significantly susceptible to deactivation or other contamination by heavy metals, especially vanadium. It would be beneficial to have a catalyst which achieved both good conversion and good selectivity to gasoline with a high octane rating for vacuum gas oil (VGO), as well as contained metals passivation or trap components, for feeds such as residua and residua blends, which contain contaminating metals. The present invention seeks to provide an FCC catalyst that is vanadium tolerant and provides high octane gasoline.

DESCRIPTION OF RELEVANT ART

Numerous cracking catalyst formulations and processes for their preparation are described in the patent literature. A good general tabulation of zeolite-containing examples can be found in U.S. Pat. No. 4,480,047, Beck et al., at Cols. 2–6. Beck et al. also review the problems associated with processing vacuum gas oil, residuum and reduced crudes. They describe a catalyst nominally containing zeolite, preferably HY zeolite and/or ultra-stable HY zeolite, clay, alumina and an acidic silica-alumina cogel matrix. The zeolite is preferably partially exchanged with high La/Ce ratio solution in a wetting step, and rare earths are precipitated onto the matrix. The catalyst has high metals tolerance and is capable of cracking heavy reduced crude oils, producing higher LCO/slurry oil ratio.

Hydrocarbon conversion catalysts comprising a zeolite dispersed in a siliceous matrix are known in the art, see for example, U.S. Pat. No. 3,140,249 and U.S. Pat. No. 3,352,796. Cracking catalysts containing a zeolite, silica-alumina, and a clay are also known, for example, U.S. Pat. No. 3,449,265. Hydrocarbon conversion catalysts comprising a physical mixture of silica-alumina and a crystalline alumino-silicate zeolite in a siliceous matrix are also known, U.S. Pat. No. 3,558,476. Processes for preparing hydrocarbon conversion catalysts containing a zeolite, clay, silica, or silica-alumina are disclosed in U.S. Pat. Nos. 3,867,308 and 3,867,310, and a process for preparing a hydrocarbon conversion catalyst containing a silica-alumina hydrogel, a clay and/or crystalline aluminosilicate zeolite is disclosed in U.S. Pat. No. 4,226,743. A process for preparing a hydrocarbon conversion catalyst containing catalytically active silica-alumina and/or silica-alumina rare earth oxide cogels, a clay and/or alumina, and crystalline alumino-silicate zeolites is disclosed in U.S. Pat. No. 4,499,197. Unfortunately, catalysts which display the greatest conversion do not produce gasoline with the highest octane and do not maximize a light cycle oil yield of improved quality at the expense of heavy cycle oil.

For example. U.S. Pat. No. 3,830,725, Dolbear et al., describes ultra-stable Y zeolite promoters, Z-14US, for hydrocarbon cracking which are exchanged with a combination of nickel and magnesium ions. These promoters have increased the selectivity for aromatic gasolines having increased the nonleaded octane ratings. The Ni and Mg-exchanged Z-14 USY zeolites may also be advantageously combined with rare earth-exchanged faujasite-containing catalysts. U.S. Pat. No. 3,929,621, Albers et al., describes a process for cracking hydrocarbons to obtain substantial yields of gasoline fractions of high aromatic and olefin content, wherein a copper-exchanged zeolite cracking catalyst capable of producing high octane gasoline is used. The exchanged zeolite is combined with a major portion of inorganic oxide matrix. U.S. Pat. No. 3,994,800, Albers et al., teaches a process for cracking hydrocarbon feedstocks with a composite catalyst comprising an improved hydrogen-exchanged Y-type zeolite component and an amorphous inorganic matrix component. The use of this catalyst yields cracked naphthas of increased olefinic content for the production of lead-free high octane gasoline. Incorporating a portion of calcined rare earth-exchanged Y-type zeolite into the composite allegedly further improves the levels of $C_3$ and $C_4$ olefins. U.S. Pat. No. 4,357,265 describes the preparation of an exchanged zeolite cracking catalyst which produces high octane gasoline with good selectivity. The catalyst is prepared by exchanging sodium zeolite Y with ammonium, calcining, mixing with oxide matrix, and exchanging with aluminum. These catalysts have allegedly higher activity than hydrogen-exchanged zeolites and better selectivity than rare earth-exchanged zeolites. U.S. Pat. No. 4,259,212, Gladrow et al., describes a cracking catalyst comprising discrete particles of ultrastable Y-type zeolite and discrete particles of alumina. These particles are dispersed in a porous oxide matrix to produce a catalyst containing 5 to 40 wt. % ultra-stable Y-type zeolite, 5 to 40 wt. % alumina, and 40 to 90 wt. % of porous oxide matrix. This cracking catalyst shows high activity and selectivity for the production of high octane gasoline fractions from higher boiling feedstocks.

The key ingredient in any FCC catalyst remains the zeolite. Typical commercial FCC catalysts generally include a crystalline alumino-silicate zeolite as the major cracking component, and the typical zeolites include hydrogen and/or rare earth metal-exchanged synthetic faujasites of the X or Y-type. For octane enhancement, the performance of the Y-type zeolite is, in general, a function of its $SiO_2/Al_2O_3$ ratio.

It is ordinarily the ultra-stable form of the Y zeolite (USY) having an $SiO_2/Al_2O_3$ ratio greater than 6 which tends to produce octane and coke-selective FCC catalyst components. The preferred USY is a hydrogen-exchanged and reduced $SiO_2/Al_2O_3$ ratio form of the Y-type zeolite. See L. A. Pines, P. J. Maher, and W. A. Wachter, *Journal of Catalysis*, 85, pp. 466-476, 1984, where the performance of USY was correlated with its $SiO_2/Al_2O_3$ ratio, it was shown that gasoline octane and coke selectivity generally increase as the $SiO_2/Al_2O_3$ ratio increases. Also, extensive ion-exchange and high temperature treatment, with or without the presence of added stem, produces an especially active and stable zeolite.

In general, the catalyst composition of an FCC hydrocarbon conversion catalyst also includes a matrix with the alumino-silicate zeolite. The matrix of an FCC catalyst serves several purposes, contributing to both the chemical and the physical characteristics of the catalyst. Chemically, it can improve the activity, alter the selectivity, improve the hydrothermal stability, increase the metals (Ni, V, Na, Fe, Cu) and nitrogen tolerance, and control the attrition and heat transfer characteristics. It also affects the density, particle size distribution, surface area, pore volume, and pore size distribution of spray-dried FCC catalyst.

The matrix of an FCC catalyst may ordinarily be comprised of inorganic oxide gels, hydrogels, sols, and/or combinations thereof, clays, synthetic or natural, inorganic oxides, and all combinations of all of the above. Silica-alumina composites, in particular, comprise a major component of many FCC catalyst matrices.

The prior art teaches a number of ways to prepare these composites to affect the chemical and physical properties of the final catalyst composition. U.S. Pat. No. 4,499,197 to Seese et al., for example, describes the preparation of inorganic oxide hydrogels, and more particularly, catalytically active amorphous silica-alumina and silica-alumina rare earth cogels. The active cogels are prepared by reacting aluminate and silicate solutions to obtain a silicaalumina pregel, and then reacting the pregel with an acidic rare earth and of aluminum salt solution under complete mixing conditions. C. J. Plank, *Journal of Colloid Science*, 2,413 (1947), describes the effect of pH, time, and exchange medium on the porous structure of a silica-alumina gel.

U.S. Pat. No. 4,226,743 describes a process for preparing a silica-alumina catalyst which is dense and attrition resistant. The silica-alumina hydrogel is precipitated at high pH and subsequently reacted with sufficient acid aluminum salt at a pH below 4 to obtain an acidic hydrogel slurry. Substantial quantities of clay and/or crystalline alumino-silicate zeolites may be included. U.S. Pat. No. 4,310,441 describes large-pore silica-alumina gels and a method for producing them. The silica-alumina gel is derived from a cationic aluminum source and also an anionic aluminum source.

In order to provide vanadium tolerance to catalysts, the prior art also teaches that other components may be added such as calcium titanate, calcium zirconate, and sepiolite in non-dispersed form.

One particular strategy involves including both the cracking catalyst, usually zeolite, and the metals trap in a single particle. Relevant examples include U. S. Pat. No. 4,266,672, Van Nordstrand, which discloses cracking catalyst and sepiolite on a single particle, and U.S. Pat. No. 4,451,355 Mitchell et al., which teaches a cracking process using a catalyst including calcium titanate or calcium zirconate as a vanadium trap in a single particle with the cracking catalyst. U.S. Pat. No. 4,520,120 the composition of matter for the catalyst of ,355. U.S. Pat. No. 4,707,461, Mitchell et al. teaches a similar catalyst using calcium compounds generally as a metals passivator on a single particle with cracking catalyst. Also teaching the use of an incorporated vanadium trap, sepiolite, in "non-dispersed form" in a single particle is U.S. Pat. No. 4,519,897, De Jong.

An alternative strategy involves the use of dual particle systems wherein the cracking catalyst is contained on one particle or component of the system, and a diluent or vanadium trap is contained as a separate, distinct entity on a second particle or component of the system. U.S. Pat. No. 4,465,588, Occelli et al., discloses a process for cracking high metals content feedstock using a novel catalyst cracking composition comprising a solid cracking catalyst and a separate and distinct diluent containing materials selected from a selected magnesium compound or a selected magnesium compound in combination with one or more heat-stable metal compounds. Among the magnesium-containing compounds specified is magnesium clay sepiolite. U.S. Pat. No. 4,465,779 teaches the cracking catalyst of '588 itself.

SUMMARY OF THE INVENTION

This invention comprises catalysts capable of hydrocarbon conversion with octane enhancement which contain magnesium clay components for reducing the contaminating effects of heavy metals, such as vanadium. Specifically, it comprises catalysts comprised of a large-pore zeolite tailored to enhance octane while maintaining high gasoline yield and conversion, a high surface area matrix tailored to contribute to both the activity and octane-enhancing characteristics of the catalyst, and a magnesium-containing clay material capable of suppressing the contaminating effect of heavy metals in said charge stock.

The catalyst of this invention comprises a composition for increasing the octane and yield of gasoline produced from a fluid catalytic cracking process, the composition comprising:

a magnesium-containing clay material capable of suppressing the contaminating effect of heavy metals in said charge stock;

a large-pore zeolite; and an amorphous silica-alumina matrix, said matrix prepared by steps comprising preparing a mixture comprising a silica sol and an aluminum salt while maintaining the pH of said mixture below about 4, and precipitating a cogel from said mixture by adjusting the pH; wherein said composition is prepared by steps comprising: combining said zeolite, clay, and cogel, provided that the pH of said cogel or said combination containing said cogel is adjusted to between about 4 and 7, and conditions are controlled to induce syneresis and viscosity reduction, and further provided that when said zeolite is introduced into said combination the pH is between about 3 and 7, and forming said combination into particles.

In addition to the clay, zeolite, and cogel matrix, a porous inorganic oxide may optionally be added to improve and/or alter the activity and the physical properties of the catalyst.

Among other factors, the catalyst converts hydrocarbon feeds to high octane gasoline, improving its quality, and contains a unique cogel matrix and a material capable of passivating or trapping heavy metals, especially vanadium.

DETAILED DESCRIPTION OF THE INVENTION

The contents of copending U.S. Pat. applications Ser. Nos. 252,236, filed Sept. 30, 1986 (abandoned), and 440,556, filed Nov. 22, 1989, and 275,470, filed Nov. 23, 1988 (abandoned), are incorporated herein by reference as if fully set forth in ipsis verbis.

The Catalyst Composition

The catalyst of the present invention consists primarily and preferentially of three components: a magnesium-containing clay material, capable of suppressing the contaminating effects of heavy metals, a large-pore, preferably Y-type, zeolite, and silica-alumina cogel.

In general, in order to employ a cracking catalyst which shows high levels of aotivity in a commercial FCC operation, it is preferred to employ a catalyst which, in the course of extended operation, maintains a level of conversion of at least 40% by weight and more preferably of at least 50% by weight. In this context, the weight percent conversion represents 100 minus the weight percent of fresh feed boiling above the temperature of 221° C. (430° F.). The weigh percent conversion includes the weight percent coke and the weight percent fresh feed boiling below the temperature of 221° C. (430° F.). The conversion capabilities may be expressed in terms of the conversion produced during actual operation of the FCC process or in terms of the conversion produced in standard catalyst activity tests.

The preferred catalyst may be further defined as one which, in its equilibrium state, exhibits a specified activity expressed as a weight percentage derived from the micro-activity test (MAT). It may also be described as one which exhibits a specified selectivity expressed as the ratio of $C_4$ olefins to the total $C_4$ product as derived by the MAT. The preferred MAT activity of the present catalyst is measured by a modified ASTM D-3907. The ASTM D-3907 procedure provides relative MAT activity for conversion of a standard feed at standard conditions. The ratio of the $C_4$ olefin to the total $C_4$ product correlates well with the octane values of the light gasoline, i.e., the higher the $C_4$ olefin to $C_4$ total ratio, the higher the octane of the light gasoline. This ratio also suggests that the octane of the heavy gasoline will also be improved. For the purposes of this invention, light gasoline is defined as the $C_5$ fraction up to material boiling at approximately 265° F. and heavy gasoline as the material boiling from approximately 265° F. to 430° F.

The foregoing weight percentage and ratio of $C_4$ olefins to the total $C_4$ product are the values obtained on a standard feed at 496° C. (925° F.), 15 to 16 (weight hourly space velocity), 3 C/O (catalyst to oil weight ratio), and calculated on the basis of a pre-equilibrated (as described at the bottom of Table 1) catalyst dried at 593° C. (1100° F.) in air.

The preferred catalyst also can be categorized as one which, in the course of extended operation, maintains a level of conversion of at least 40% by weight or volume and, more preferably, of at least 50% by weight or volume on particularly on a feedstock such as Feedstock A in the Examples.

As discussed above, the preferred catalyst composition comprises the primary components: zeolite, a cogel matrix, and magnesium-containing clay. Each of these components is more specifically defined as follows.

The Magnesium-Containing Clay Component

The first component of the present invention comprises a magnesium-containing clay. This serves the function of suppressing the contaminating effect of metals such as vanadium or nickel on FCC catalyst. These compounds can include attapulgite, sepiolite, chrysotile, montmorillonite, saponite, chlor , smectite, vermiculite, mica, kaolinites, other magnesium-containing clay minerals as f in , R. E. Grim, "Clay Mineralogy", McGraw-Hill (2nd 1968).

The preferred magnesium-containi clays comprise hydrous magnesium silicate, more prefe sepiolite, (most preferably Spanish sepiolite te, talc and micro-cell-E, a synthetic ve of sepiolite. It is preferred that the magnesium be in crystalline form, and low in both iron, potassium and sodium. Alternatively, the magnesium material m also be pretreated by any conventional means to reduce the amount of extraneous sodium or iron in the clay.

Substantial amounts of clay can be incorporated into the cogel before the MAT activity decreases, for example, up to about 50% by weight. In addi ty and the selectivity of the matrix can be clay which is incorporated. For example, a magnesium-containing clay, such as sepiolite, not only increases the pore volume of the cogel, it also reduces its coke and gas production.

The clay is also used to weigh the catalyst and to impart unique physical and chemical characteristics to the matrix. The actual physical characteristics imparted to the matrix depend on particle size and the degree of association of the clay particles. The modes of association in clay suspensions can be controlled by the use of dispersants and by pH. It is preferred that, when the clay is incorporated into the catalyst in an aqueous solution, the clay has a pH of greater than about 7.

In the preferred embodiment, peptizing agents or pH are used to reduce the viscosity of the clay suspensions, and thus reduce the rigid structures which are present. A preferred embodiment of the matrix preparation comprises reducing the viscosity of the amorphous silica-alumina cogel by acidification, then adding a clay suspension. The preferred clay is sepiolite, or a sepiolite and kaolin mixture whose viscosity has been reduced by adjusting the pH to 7, preferably 8 or greater. The cogel-clay slurry is homogenized, the pH is adjusted to between 5 and 6, and then aged overnight at ambient temperature.

To determine the effect that the clay has on the physical and chemical properties of the amorphous silica-alumina after aging the slurry, its pH was adjusted and the slurry was spray-dried. Table 1 shows the effect that kaolin and sepiolite have on the surface area and pore volume of the amorphous silica-alumina cogel.

As also shown in Table 1, substantial amounts of clay can be incorporated into the cogel before the MAT activity decreases. In addition, the activity and the selectivity of the matrix can be altered by the clay which is incorporated. For example, a magnesium-containing clay, such as sepiolite, not only increases the pore volume of the cogel, it also reduces its coke and gas production. This is demonstrated in Table 1, Matrices 8 and 9.

The Cogel Matrix Component

Silica, alumina and their amorphous mixtures are well known as matrices or supports for catalysts used in hydrocarbon conversion processes. The method of preparation controls physical properties, such as pore structure and volume, surface area, density and catalyst strength, which in turn governs the resultant activity such as cracking or isomerization. It must be noted that seemingly very minor differences in the preparation factors discussed below can make significant differences in the make-up and effectiveness for a particular purpose of the matrix and a catalyst of which it may be a component.

The numerous specific factors that are involved in preparing matrix materials containing silica-alumina mixtures include:
1. the mole ratio of silica to alumina;
2. the molar concentrations of the silica and alumina in water;
3. the type and/or source of silica;
4. the type and/or source of alumina;
5. the order of addition of silica and alumina;
6. the pH of the solutions when combined;
7. the pH of the mixture during precipitation;
8. the pH of the mixture after precipitation;
9. the precipitating agent;
10. temperatures throughout the process;
11. mixing rates;
12. presence or absence of aging;
13. presence or absence of syneresis;
14. peptization agent;
15. washing and washing agents;
16. method of drying.

The final matrix is highly sensitive to each of these factors, and variations among these factors, especially in combination, will greatly influence the particular properties of the final matrix produced.

The patent literature contains numerous descriptions that teach and claim specific methods of matrix and catalyst preparation for FCC catalyst. Some recent patents for preparing matrices and FCC catalysts therefrom include: U.S. Pat. No. 4,617,108, Shyr, which purports to teach a process where catalyst is prepared by a method comprising preparing hydrogel by mixing an aluminum, ammonium and salt of a strong ($pKa < 2$) acid, and alkali metal silicate such that the concentration of ammonium is enough to form a hydrogel, separating the hydrogel from solution and calcining it to form acidic silica-alumina. Shyr teaches the combination of this matrix with clay and zeolite for use in an FCC unit.

U.S. Pat. No. 4,198,319, Alafandi, discloses a process where catalyst is prepared by a method comprising mixing in a slurry a faujasite or silica-alumina gel containing 50–70 mole silica, and clay, and spray-drying slurry into a catalyst. Alafandi also shows combinations of gel with clay and zeolite for use in an FCC unit.

U.S. Pat. No. 4,289,653, Jaffe teaches preparing an extruded catalyst by mixing aluminum sulfate and sulfuric acid with sodium silicate to form a silica sol in an alumina salt solution at pH of 1–3, adding $NH_4OH$ under substantially constant pH of at least 4 to 6; adding more $NH_4OH$ to form a cogelled mass to pH 7.5–8.5; washing cogelled mass; mulling the mass with peptizing agent, a Group VI-B metal compound and a Group VIII metal compound to form extrudable dough; extruding; and drying and calcining.

The present invention comprises a particular amorphous silica-alumina cogel. This cogel is surprisingly active for the cracking of large molecules, such as in vacuum gas oils, to smaller molecules, such as gasoline, and finds particular use as the active matrix of the catalyst of the present invention. The olefinicity of the products, as indicated by the $C_4$ olefin to $C_4$ total ratio, is surprisingly high. This is indicative of gasoline of high octane. This cogel can be formed into spheres via spray-drying, and then subsequently dried to a water content of less than 5 wt. % or incorporated into a multi-component catalyst.

The process for preparing the amorphous silica-alumina cogel yields a material which is surprisingly attrition-resistant in spray-dried spheres, and is surprisingly versatile with respect to the pore volumes, pore size distributions and densities, apparent bulk densities, attainable. Among the unique characteristics of the cogel are:

high MAT conversions obtainable between 65% and 80%;

high surface areas, ranging from about 150 to 450 $m^2/gm$;

$N_2$ pore volumes ranging from about 0.2 cc/gm to 1.2 cc/gm;

$N_2$ pore size distribution peak diameter ranging from about 30 Å to 260 Å, most pores occurring in the meso pore range of 20 to 500 Å. (Micropores are defined as <Å. Macropores are defined as >500 Å.) This allows access into the catalyst of larger hydrocarbon molecules, rendering the present catalyst particularly suitable for residua U.S. Pat. applications.;

$\gamma$-$Al_2O_3$ content of the cogels of less than 20 wt. %, usually <5%, after calcining;

high resistance to attrition.

In a preferred embodiment, the cogel is prepared by the steps comprising:

1. adding a silicate solution to an aqueous solution of an acid aluminum salt, such as aluminum chloride or aluminum sulfate and an acid, such as hydrochloric or sulfuric, but preferably a weak acid such as acetic, to form an acidified silica sol in said aluminum salt solution; the pH of said mixture being in the range of 1 to less than about 4;
2. raising the pH of the mixture by adding base, such as NaOH or $NH_4OH$, preferably $NH_4OH$, to a pH range of about 5–9;
3. aging the cogelled silica alumina hydrogel by time and/or temperature combinations; a preferred time and temperature is up to 3 hours at ambient to 95° C.;
4. adjusting the pH of the cogel slurry to about 5 to 9;
5. removing the filtrate to obtain a cogelled hydrogel;
6. adding an acid, such as nitric, sulfuric, or hydrochloric, but preferably a weak acid such as acetic acid, to adjust the pH to 4–7 to induce controlled syneresis and reduce viscosity. Various combinations of time, temperature, pH and Na+concentration can also be used to induce the desired syneresis;
7. spray-drying the cogel to form spherical particles;
8. washing either the cogelled hydrogel or the spray-dried particles to reduce the Na2O content to less than 1 wt. %. The cogels can be made in either a batch or a continuous mode.

Several definitions and explanations are required to clarify further the steps comprising the preparation of the cogel. First, the silica sol described in Step 1 is preferably defined as a colloidal dispersion or suspension of the metal oxide in a liquid. In step 3, "hydrogel" may be described as a coagulated colloid with an imbibed liquid phase. In step 6, "syneresis", which will be described more fully below, refers to molecular rearrangements which occur in hydrogels, in particular, silica and silica-alumina hydrogels. These rearrangements consist of condensation reactions among the units present in the hydrogels. Any factors which promote or disrupt these reactions affect the structure of the hydrogel and the structure of the final dried gel.

A process parameter critical to the successful creation of the desired catalyst is the syneresis of the cogel. Syneresis may be best defined or analogized to an aging process in which a composition, particularly a gel, contracts and gives up a liquid, usually water, in the process. This syneresis in the present invention materially alters the nature of the cogel and therefore the catalyst, rendering it uniquely suitable for the purposes discussed above. For a discussion of syneresis in silica-alumina gels, see C. J. Plank et al., J. Colloid. Sci., 2 (1947) 399, and C. J. Plank, J. Colloid. Sci., 2 (1947) 413, incorporated herein by reference.

Several factors affect syneresis. Among these are the composition of the gel, the solids concentration of the gel, the pH, time, temperature, [$Na^+$] and the base exchange medium. Consequently, step 6 helps to control the physical and chemical characteristics of the spray-dried product, e.g. pore volume and pore size distribution. Aging at temperatures of about 25–105° C., preferably 60–90° C., in step 3 affects the rate of filtration in step 5 and the physical characteristics of the spray-dried product of step 7. In a less preferred embodiment, step 6 may be eliminated. Step 8, washing the cogelled mass or the spray-dried particles, may be accomplished at ambient or elevated temperatures, i.e. <100° C., with base exchange medium such as ammonium acetate, or $Al^{+++}$ containing solution to reduce the $Na^+$ concentration to less that about 0.5 wt. %. Ammonium acetate at elevated washing temperatures is particularly effective. Step 8 may be done at various points in the procedure after step 2. Generally, the cogel is washed prior to mixing with the zeolite. The gellation, encompassed by step 1 and 2, may be done in a batch or continuous manner.

This amorphous silica-alumina matrix shows high MAT conversion both as prepared and after steaming. Table 1 shows the MAT results of our steamed cogel component, and compares its MAT results to those of a commercial octane catalyst, tradenamed Octacat, manufactured by Davison Co., division of W. R. Grace, which has been steamed at the same conditions. The amorphous cogel clearl compares favorably to the Octacat in conversion.

The Zeolitic Component

The third component of this invention comprises a large-pore, crystalline alumino-silicate zeolite, a preferred example of which is a "stabilized" hydrogen Y-type faujasite or "ultra-stable" Y-type faujasite. These zeolites are well known, and Y zeolite itself is disclosed in U.S. Pat. No. 3,130,007, Breck. U.S. Pat. Nos. 3,293,192 and 3,402,996 also describe "stabilized" or "ultra-stable" Y-type zeolites. All are incorporated herein by reference. "Zeolite Chemistry and Catalysis", Jule A. Rabo, ACS Monograph 171, (1976), Chapters 3 and 4, provides a useful reference describing the preparation and characteristics of the various Y-type zeolites.

For the purpose of this invention, "ultra-stable Y zeolite" refers to a Y zeolite which is highly resistant to degradation of crystallinity by high temperatures and steam treatment. A particular key to producing the "ultra-stable" form is to calcine a low sodium ammonium or hydrogen Y zeolite in an $NH_3$ or $H_2O$ atmosphere.

A more preferred Y zeolite is characterized by an $R_{20}$ content (where R is Na, K or any other alkali metal ion) of less than 4% by weight, preferably less than 1% by weight, a unit cell size less than about 24.60 Angstrom units (Å), and a $SiO_2/Aa_2O_3$ mole ratio in the range of 3.5 to 7 or higher. The "ultra-stable" form of the Y zeolite is ordinarily obtained using a series of alkali metal reduction steps followed by calcination at high temperature in the presence of ammonia or water.

In a preferred example, NaY, such as Union Carbide zeolite LZ-Y52, which has an Na2O content of 13.0% by weight, a cell constant of 24.68 Å, and an $SiO_2$ to $Al_2O_3$ ratio of 4.8, is base-exchanged with an aqueous solution of an ammonium salt, such as ammonium nitrate until the alkali metal content is reduced to about 4% or less by weight $Na_2O$. The result is an ammonium Y, Union Carbide zeolite LZ-Y62, which has an $Na_2O$ content of 2.4% by weight, a cell constant of 24.73 Å, and an $SiO_2$ to $Al_2O_3$ ratio of 5.2. It is then calcined at a temperature of 538° C. (1000° F.) to 816° C. (1500° F.) over a period of 0.5 to 5 hours. Steam may be added to the system during calcination. This results in a high sodium form of an "ultra-stable" hydrogen Y zeolite which has a unit cell size of about 24.5 Å.

Another example of an appropriate zeolite is Union Carbide zeolite LZ-Y72 which has an $Na_2O$ content of 2.7% by weight, a cell constant of 24.51 Å, and an $SiO_2$ to $Al_2O_3$ ratio of 5.2. Preferably, the "ultra-stable" hydrogen Y zeolite is again successively base-exchanged with an aqueous solution of ammonium salt until the $Na_2O$ content is reduced to less than 1% by weight. As an example, successive base-exchanged LZ-Y72 yields Union Carbide zeolite LZ-Y82 having an $Na_2O$ content of 0 20% by weight, a cell constant of 24.51 Å, and an $SiO_2$ to $Al_2O_3$ ratio of 6.4.

More preferably, the lww sodium "ultra-stable" hydrogen Y zeolite is calcined again in the presence of steam at a temperature of about 538° C. (1000° F.) to about 816° C. (1500° F.) for 0.5 to 5 hours, to produce a "superstable" hydrogen Y zeolite having a cell constant of less than 24.40 Å. An example is Union Carbide LZ-Y20 which has a $Na_2O$ content of 0 20% by weight, and a cell constant equal to 24.36 Å.

This sequence of ion exchange and treatment in a hydrothermal environment results in the substantial reduction of the alkali metal content of the original zeolite and a substantial reduction in the unit cell size. This combination is believed to lead to the ultrahigh stability of the resultant Y zeolite.

The alkali metal content of crystalline alumino-silicates should preferably be low in order to increase the thermal and hydrothermal stability of the cracking catalyst. The alkali metal content of the zeolite is ordinarily reduced by using a base-exchange procedure. The exchange occurs by repeatedly or continuously contacting the zeolite with aqueous solutions of salts or other compounds to effect the exchange of the alkali metal by the cations in the aqueous solution. These cations can be polyvalent metal cations or hydrogen and/or hydrogen precursors, such as ammonium.

In a preferred embodiment, the zeolitic component of this invention is exchanged with rare earth ions such as lanthanum, cerium, praseodymium, neodymium, promethium, samarium, europium, gadolinium, terbium, dysprosium, holmium, erbium, yttrium, thulium, scandium, lutetium, or mixtures thereof. In a more preferred embodiment, the rare earth ion will be primarily lanthanum. The presence of rare earth metal ion improves both the thermal and hydrothermal stability of the Y zeolite.

U.S. Pat. No. 3,537,816 describes a process for further reducing the alkali metal content of a crystalline zeolitic alumino-silicate of the faujasite type which has had its alkali metal content previously reduced by at least one base-exchange with an aqueous solution containing at least rare earth metal ions which replace part of the alkali metal ions. This is ordinarily done by suspending the zeolite in water together with a water-insoluble organic cation-exchange resin in the form selected from the hydrogen and the ammonium forms so as to replace $H^+$ or $NH_4^+$ for the alkali metal ions.

In preferred embodiments, a super-stable Y, preferably Union Carbide LZ-Y20 or Union Carbide LZ-Y82, comprises the zeolite in the composited catalyst. It is chosen primarily for its coke selectivity and reduced hydrogen transfer activity.

In a still more preferred embodiment of the present invention, ultra-stable Y zeolite which has also been rare earth-exchanged is utilized. Table 2 summarizes MAT data for a physical mixture of 20 wt. % zeolite and an inactive diluent. The rare earth-exchanged zeolite in this example, LZ-Y20, clearly shows an improved hydrothermal stability, which is reflected in a higher conversion at constant operating conditions than its non-exchanged counterpart.

TABLE 2

Effect of Rare Earth Exchange on the MAT Conversion of SSY

| Feed Properties | | |
|---|---|---|
| Feed | A | |
| Aniline Point, °F. | 181.5 | |
| API Gravity | 23.5 | |
| Nitrogen, ppm | 1600 | |
| Ramsbottom Carbon, wt. % | 0.1 | |
| Zeolite Properties | | |
| Zeolite Type | LZ-Y20 | REX (LZ-Y20) |
| Zeolite Lattice Constant, Å | 24.38 | 24.38 |
| wt % $La_2O_3$ | 0 | 2.2 |
| MAT Data[1] | | |
| Temperature | 516° C. | 516° C. |
| WHSV | 15 | 15 |
| C/O | 3 | 3 |
| Conversion, wt. %[2] | 36 | 48 |
| $C_4-$ | 6.6 | 9.7 |
| $C_5-430$ | 28 | 36 |
| 430-650 | 23 | 23 |
| 650+ | 42 | 29 |
| Coke | 1.3 | 1.6 |

[1]The catalysts consist of 20 wt. % zeolite and 80 wt. % of an inert diluent.
[2]The zeolite was steamed.

The Inorganic Oxide Component

Inorganic oxides can be added to the catalyst to alter both the chemical and physical characteristics of the cracking catalyst. For example, the sodium or nitrogen tolerance of the octane catalyst can be increased using a separate phase alumina. The oxides or oxide precursors should be well dispersed and can be added directly to the prepared cogel, or to the sol prior to the cogellation of the amorphous silica-alumina phase during the cogel preparation. They are preferably porous, and are preferably selected from Group III, IV, V metal oxides, and mixtures thereof.

Having described the basic aspects of the present invention, the following examples are given to illustrate specific embodiments thereof. For all the examples below, the weights are given on a dry or water-free basis. Dispersants are used where necessary to improve viscosity.

Examples 1-6 are illustrative of the cogel component of this invention. Data for Example 1 is shown in Table 1. The data for examples 2-6 are shown in Table 3. It is believed that the vanadium tolerance of any of the following catalysts using the instant cogel can be improved with a magnesium-containing clay.

EXAMPLES

Example 1 - Cogel

Into a mixing tank, 1.808 lbs. of acetic acid was added to 10.25 lbs. of deionized (DI) water. 24.173 lbs. of aluminum trichloride solution was added, which contained 4.38 wt. % aluminum and which had a pH of 1.1. The solution was stirred for 10 minutes and had a resultant pH of about 0.44.

Into a different mixing vessel, 10.453 lbs. of a sodium silicate solution containing 28.7 wt. % $SiO_2$ with 56.69 lbs. of DI water. The solution was mixed for 10 minutes and had a resultant pH of about 10.3.

The sodium silicate solution was slowly pumped into the tank containing the aluminum trichloride solution. It took 52 minutes to add the silicate solution; the final solution was clear and had a pH of about 2. The aluminum trichloride solution was stirred vigorously.

A dilute soltion of $NH_4OH$ by adding 13.48 lbs. of $NH_4OH$. which contained 28 wt. % $NH_3$ to 43.28 lbs. of DI $H_2O$. The $NH_4OH$ solution was slowly pumped into the silica-, alumina-, acetic acid solution, with vigorous mixing, until a pH of 8 was reached. It took approximately 57 minutes to add the $NH_4OH$. The ammonium hydroxide addition rate must be sufficiently slow to prevent the contents of the vessel from hydrogelling too quickly.

The resulting slurry was stirred for 3 hours and the final pH was readjusted to 8, if necessary. The slurry was filtered at room temperature.

The filter cake was washed with a solution of 1.18 lbs. of $NH_4HCO_3$ dissolved in 30 liters of water (DI). This wash was repeated three more times. It was then washed once with 30 liters of water (DI), and filtered at room temperature to yield a filter cake. The filter cake was acidified with acetic acid to reduce the pH to about 5.6. The resultant slurry was homogenized with a high shear mixer, (it could also be done using a colloid mill) and the acidified cogel was aged at room temperature for 16-36 hours.

Prior to spray-drying, the aged cogel was rehomogenized. Additives can be used to reduce the viscosity to aid in spray-drying if necessary. The cogel was spray-dried to produce an attrition resistant microspherical catalyst.

Example 2 - Cogel

Additional cogel catalyst samples were prepared as in Example 1 This time, the washed and dried filter cake was divided into several batches, A-E, for further treatment and spray-drying.

Batch A: 600 mls. of water (DI) was added to 4100 grams of cogelled mass. The mixture was homogenized. Its pH was about 8.1. The mixture was then spray-dried.

Batch B,C,D: 62 grams of acetic acid was added to 8,679.04 grams of the cogelled mass (LOI ~ 90 wt. %) to reduce the pH to about 5.42 and induce syneresis. Twenty-two (22) additional grams of acetic acid were added to reduce further the pH to 4.83. The mixture was then homogenized, after which ammonium hydroxide was added to raise the pH to 5.59.

Batch B was aged at ambient temperature for 1 hour. The pH was 5.59.

Batch C. was aged at ambient temperature for 4 hours. The pH was 5.61.

Batch D was aged at ambient temperature for 24 hours. The pH was 5.81.

Batch E: 50 grams of acetic acid was added to 4544 grams of the cogelled mass (LOI-90) to adjust the pH to 5.58. An additional 28 grams of acid was added to reduce the pH further to 5.21, and finally 19 grams more was added to reduce the pH to 4.85. The mixture was constantly homogenized. The pH was then raised to 5.58 by adding ammonium hydroxide. The material was again homogenized, screened, and aged at ambient conditions for 24 hours.

Prior to spray-drying, all these materials were homogenized. They were then all spray-dried to form an attrition resistant microspherical cogel catalyst.

Example 3 - Cogel

Additional cogel catalyst samples were prepared as in Example 2, all using the syneresis step as in Batch E. The materials were spray-dried at various spray-drying conditions to form Batches F, G, H, I, and J. The results are shown in Table 3.

Example 4 - Cogel

Material was prepared as in Example 1, except the after titrating with $NH_{40}H$, to a pH of 8, the slurry was heated to 52° C. for a total heating time of about 30 minutes, and filtered. The cake was washed as in Example 1. The syneresis step was accomplished by adding acetic acid to reduce the pH to 4.96. $NH_4OH$ was added to raise the pH to 5.63. The material was homogenized, aged overnight to a pH of ~5.57, rehomogenized, and spray-dried.

Example 5 - Cogel Material was prepared as in Example 4, except that the slurry was heated to 81° C. for 47 minutes.

Example 6 - Cogel

Material was prepared as in Example 4, except that it was titrated with $NH_{40}H$ to a pH of 5.6, heated to 80° C. over a 30 minute period and held at 80° C. for 10 minutes.

TABLE 3

|  | Example 2 | | | | | Example 3 | | | | | Example 4 | Example 5 | Example 6 |
| --- | --- | --- | --- | --- | --- | --- | --- | --- | --- | --- | --- | --- | --- |
|  | A | B | C | D | E | F | G | H | I | J | | | |
| Surface area (m²/g) | 317 | 311 | 312 | 326 | 355 | 378 | 373 | 385 | 367 | 374 | 342 | 322 | 371 |
| Pore Size Dist.[1] (diameter, Å) | 149 | 37 | 37 | 35 | 133 | 49 | 43 | 89 | 43 | 41 | 59 | 79 | 179 |
| Pore Volume, cc/g | 0.79 | 0.40 | 0.41 | 0.29 | 0.64 | 0.49 | 0.50 | 0.71 | 0.48 | 0.47 | 0.54 | 0.67 | 0.94 |
| Al[2] | — | — | — | — | — | 6 | — | — | — | — | 2 | — | -4 |
| wt. % γAl2O3[3] | 2 | <5 | — | — | 2 | 10 | 12 | 10 | 14 | 13 | 17 | 19 | 2 |
| MAT[4] | | | | | | | | | | | | | |
| Conversion, wt. % - | 73 | 75 | 73 | 77 | 75 | 79 | 75 | 76 | 77 | 77 | 70 | 70 | 74 |

TABLE 3-continued

|  | Example 2 | | | | | Example 3 | | | | | Example 4 | Example 5 | Example 6 |
|---|---|---|---|---|---|---|---|---|---|---|---|---|---|
|  | A | B | C | D | E | F | G | H | I | J | | | |
| $C_5$–430 | 39 | 40 | 40 | 41 | 40 | 40 | 39 | 41 | 40 | 39 | 39 | 39 | 41 |
| Coke | 14 | 12 | 12 | 13 | 13 | 15 | 14 | 13 | 14 | 14 | 10 | 9 | 11 |
| $C_4E/C_4T$ | 0.50 | 0.42 | 0.42 | 0.37 | 0.44 | 0.40 | 0.42 | 0.41 | 0.40 | 0.41 | 0.50 | 0.53 | 0.49 |

(1)PSD peak diameter determined by nitrogen physisorption
(2)Attrition Index
(3)$\gamma Al_2O_3$ determined by X-ray diffraction
(4)Feed A

Example 7A - Cogel and Kaolin

Forty (40) pounds of acidified cogel was prepared using the procedure in Example 1.

Ten (10) pounds of Georgia kaolin was slurried in 15–20 of water (DI) and enough tetrasodiumpyrophosphate added to reduce the viscosity to about 1.5 wt. % of the clay on a dry basis. Sufficient $NH_4OH$ was added to reduce the pH of the kaolin slurry to about 9.

The kaolin slurry was slowly added to the acidified cogel with stirring, and the mixture was homogenized.

The mixture was spray-dried to produce a microspherical catalyst containing 80% by weight cogel with an $SiO_2$ to $Al_2O_3$ weight ratio equal to 60 to 40 and 20% by weight Georgia kaolin.

The same procedures were used to prepare the cogel-kaolin catalyst containing 10, 50, and 60 wt. % kaolin. These are labeled Examples 7B, 7C., and 7D, respectively in Table 1.

Example 8 - Cogel and Spanish Sepiolite

Sixty-nine (69) pounds of non-acidified cogel as described in Example 1 was prepared. Sixty-nine (69) pounds of cogel was mixed with 65 lbs. of water (DI) and homogenized.

Thirty-one (31) pounds of Spanish sepiolite was added to the cogel with mixing. Sufficient acetic acid was added to reduce the pH to 5.6 and the slurry was homogenized with a high shear mixer. The mixture was then aged for 16 to 36 hours.

Prior to spray-drying, the aged cogel was rehomogenized. Again, additives can be used to reduce the viscosity to aid in spray-drying, if necessary.

The slurry was spray-dried to produce a microspherical catalyst containing 69% by weight cogel ($SiO_2$ to $Al_2O_3$ weight ratio equal to 60 to 40) and 31% by weight Spanish sepiolite.

Example 9 - Cogel and Sepiolite and Kaolin

Fifty-three (53) pounds of non-acidified cogel as described in Example 1 was prepared. The cogel was mixed with 60 lbs. of water (DI) and 23 lbs. of Spanish sepiolite was also dispersed in water (DI).

Twenty-four (24) pounds of Georgia kaolin was dispersed in water (DI). The sepiolite and the kaolin were added to the cogel and homogenized.

The pH of this combined slurry was adjusted to 5.6 by adding acetic acid, and the mixture was aged for 16 to 36 hours at ambient temperature.

Prior to spray-drying, the aged slurry was rehomogenized, and tetrasodiumpyrophosphate (TSPP) dissolved in water was added in an appropriate amount to reduce the viscosity.

The mixture was spray-dried to produce a microspherical catalyst containing 53% by weight cogel ($SiO_2$ to $Al_2O_3$ weight ratio equals 60 to 40), 23% by weight Spanish sepiolite and 24% by weight Georgia kaolin.

TABLE 1

| | Physical and Chemical Properties of Matrix Materials | | | | | | | |
|---|---|---|---|---|---|---|---|---|
| Matrix | 1 | 7B | 7A | 7C | 7D | 8 | 9 | Octacat |
| Composition | | | | | | | | |
| Cogel, wt. % | 100 | 90 | 80 | 50 | 40 | 69 | 53 | |
| $SiO_2/Al_2O_3$ wt. ratio | 1.5 | 1.5 | 1.5 | 1.5 | 1.5 | 1.5 | 1.5 | |
| Clay | | | | | | | | |
| Type A | — | Kaolin(1) | Kaolin | Kaolin | Kaolin | — | Kaolin | |
| wt. % | — | 10 | 20 | 50 | 60 | — | 24 | |
| Type B | — | — | — | — | — | Sepiolite(2) | Sepiolite | |
| wt. % | — | — | — | — | — | 31 | 23 | |
| Surface Area, $m^2$/gm | 308 | 386 | 259 | 179 | 144 | 287 | 120 | |
| Pore Volume, cc/gm | 0.44 | — | 0.50 | 0.56 | 0.54 | 0.84 | — | |
| MAT Data(3) | | | | | | | | |
| Feed | A | | | | | | | |
| WHSV | 15 | | | | | | | |
| C/O | 3 | | | | | | | |
| Temperature, °C. | 496 | | | | | | | |
| Conversion, wt. % | 48 | 46 | 42 | 41 | 35 | 43 | 42 | 51 |
| $C_4$– | 8.9 | 7.6 | 6.9 | 5.8 | 4.1 | 7 | 7 | 9 |
| $C_5$–430 | 35 | 35 | 32 | 32 | 29 | 33 | 32 | 40 |
| 430–650 | 27 | 28 | 26 | 26 | 27 | 27 | 26 | 23 |
| 650+ | 25 | 26 | 33 | 33 | 38 | 29 | 32 | 26 |
| Coke | 3.6 | 3.4 | 3.1 | 2.8 | 2.3 | 2.7 | 2.7 | 2.2 |

(1)Georgia Kaolin.
(2)Spanish Sepiolite.
(3)The spray dried catalyst materials were steamed for five hours at 788° C. (1450° F.) in 100% steam.
Octacat, sold by Davison Chemical Division, W.R. Grace and Co., was steamed at the same conditions.

Example 10 - Comparative FCC Catalyst

Fifty (50) pounds of acidified cogel as prepared in Example 3 was prepared.

16.67 Pounds of LZ-Y82 zeolite (unit cell constant equals 24.52Å) was dispersed in 30 lbs. of water with a high shear mixer and/or colloid mill. The dispersed zeolite was added to the acidified cogel and rehomogenized.

The pH was adjusted to 5.6 and the slurry was allowed to age at ambient temperature for 16 to 36 hours.

Prior to spray-drying, the slurry was rehomogenized, and then spray-dried to produce a microspherical catalyst.

Example 11 - FCC Catalyst of the Invention

Forty-four (44) pounds of acidified cogel as described in Example 3 was prepared.

Twenty-seven (27) pounds of LZ-Y82 zeolite (unit cell constant equals 24.52Å) was dispersed in 44 lbs. of water (DI) with a high shear mixer and/or colloid mill.

Twenty-nine (29) pounds of Spanish sepiolite was dispersed in 60 lbs. of water, using TSPP to reduce the viscosity. The zeolite slurry was then pumped into the acidified, homogenized cogel with stirring.

The sepiolite mixture was added to the cogel/zeolite slurry, the pH was adjusted to 5.6, and the slurry homogenized. The mixture was aged 16 to 36 hours at ambient temperature. The slurry was rehomogenized and spray-dried to produce a microspherical catalyst.

Example 12 - FCC Catalyst of the Invention

The preparation as described in Example 11 was repeated, using 27 lbs. of LZ-Y82 zeolite (unit cell constant equals 4.52Å).

Example 13 - FCC Catalyst of the Invention

The preparation described in Example 11 was repeated, using 30 lbs. of LZ-Y82, 20 lbs. of the Spanish Sepiolite, and 50 lbs. of cogel.

Example 14 - FCC Catalyst of the Invention

The preparation described in Example 11 was repeated, using 25 lbs. of Union Carbide's LZ-Y82, 20 lbs. of the Spanish Sepiolite, and 55 lbs. of cogel.

The MAT activities of catalysts with and without clay are shown in Table 4; these catalysts are also compared with Octacat and Octacat D. As can be seen, the present catalysts (Examples 11-14) give equivalent or better results than the comparatives when used on the low metals feed, Feed A.

Table 5, below, summarizes the MAT results using a vanadium poisoned catalyst. These results represent typical residuum operations, which are plagued by poisoning and deactivation of the catalyst with heavy metals, especially Ni and V. This table clearly shows the advantages of our invention in the presence of 4400 ppm V over the commercial octane catalysts, Octacat and Octacat D and a metals-tolerant catalyst, GRZ-1. Thus, Examples 12 and 14 show the improved gasoline yield and the decreased coke yield when sepiolite is a component of our catalyst composition.

TABLE 4

| Example | 10 | 11 | 12 | 13 | 14 | Octacat[1] | Octacat D[1] |
|---|---|---|---|---|---|---|---|
| Composition | | | | | | | |
| Zeolite | LZ-Y82 | LZ-Y82 | LZ-Y82 | LZ-Y82 | LZ-Y82 | USY | USY |
| Lattice Constant, Å | 24.52 | 24.54 | 24.52 | 24.52 | 24.54 | | |
| Matrix | | | | | | | |
| Cogel, wt. % | 75 | 44 | 44 | 50 | 55 | | |
| Clay | — | Sepiolite[3] | Sepiolite | Sepiolite | Sepiolite | | |
| wt. % | — | 29 | 29 | 20 | 20 | | |
| MAT Data[2] | | | | | | | |
| Feed | A | | | | | | |
| WHSV | 15 | | | | | | |
| C/O | 3 | | | | | | |
| Temperature, °C. | 496 | | | | | | |
| Conversion, wt. % | 63 | 62 | 60 | 61 | 61 | 51 | 63 |
| $C_4-$ | 12 | 11 | 12 | 11 | 11 | 9 | 11 |
| $C_5$-430 | 48 | 48 | 45 | 47 | 47 | 40 | 48 |
| 430-650 | 23 | 24 | 24 | 24 | 24 | 23 | 23 |
| 650+ | 14 | 14 | 17 | 15 | 15 | 26 | 14 |
| Coke | 3.5 | 3.0 | 3.5 | 3.5 | 3.1 | 2.2 | 3.8 |
| $C_4E/C_4T$ | 0.48 | 0.49 | 0.55 | 0.48 | 0.50 | 0.50 | 0.49 |

[1]Octane catalysts sold by Davison Chemical Division, W.R. Grace and Co.
[2]The spraydried catalysts, matrices, and commercial catalysts.
[3]Spanish Sepiolite

TABLE 5

| | Comparative Catalyst Performance | | | | | |
|---|---|---|---|---|---|---|
| Example | 10 | 12 | 14 | Octacat[1] | Octacat D[1] | GRZ1[3] |
| MAT Data[2] | | | | | | |
| Feed | A | | | | | |
| WHSV | 15 | | | | | |
| C/O | 3 | | | | | |
| Temperature, °C. | 496 | | | | | |
| Conversion, wt. % | 51 | 53 | 54 | 24 | 38 | 58 |
| $C_4-$ | 8 | 8 | 9 | 3 | 5 | 12 |
| $C_5$-430 | 35 | 40 | 40 | 19 | 30 | 41 |
| 430-650 | 26 | 26 | 26 | 23 | 26 | 19 |
| 650+ | 23 | 21 | 21 | 53 | 36 | 24 |

TABLE 5-continued

| Example | Comparative Catalyst Performance | | | | | |
|---|---|---|---|---|---|---|
|  | 10 | 12 | 14 | Octacat[1] | Octacat D[1] | GRZ1[3] |
| Coke | 7.3 | 4.9 | 4.2 | 2.3 | 3.2 | 5.1 |
| C$_4$E/C$_4$T | 0.65 | 0.63 | 0.61 | 0.68 | 0.71 | 0.26 |
| Metals on Catalyst Vanadium, ppm |  |  |  | ← 4400 → |  |  |
| Wt. % Sepiolite (Spanish) | 0 | 29 | 20 | 0 | 0 | 0 |

[1]Octane catalysts sold by Davison Chemical Division, W.R. Grace and Co.
[2]The catalysts were loaded with vanadium from a vanadium naphthenate/toluene solution, heated in N$_2$ stepwise to 593° C., then calcined at 593° C. in air for four hours. The calcined and commercial catalysts were steamed for five hours at 788° C. in 100% steam.
[3]A metals-tolerant catalyst sold by Davison Chemical Division, W.R. Grace and Co.

What is claimed is:

1. A composition for the catalytic cracking of a high metals content charge stock which comprises:
   (a) an amorphous silica-alumina matrix, said matrix prepared by steps comprising preparing a mixture comprising a silica sol and an aluminum salt while maintaining the pH of said mixture below about 4, and precipitating a cogel from said mixture by adjusting the pH;
   (b) a magnesium-containing clay material capable of suppressing the contaminating effect of heavy metals in said charge stock; and,
   (c) a large-pore zeolite;
wherein said composition is prepared by steps comprising:
   (i) combining said zeolite, clay, and cogel, provided that the pH of said cogel or said combination containing said cogel is adjusted to between about 4 and 7, and conditions are controlled to induce syneresis and viscosity reduction, and further provided that when said zeolite is introduced into said combination the pH is between about 3 and 7; and
   (ii) forming said combination into particles.

2. The composition as claimed in claim 1 wherein said catalyst composition has meso and macro pore sizes, high surface area, and high pore volume.

3. The composition as claimed in claim 2 wherein said mesopore sizes are between 20 to 500 Å in diameter and said macro pore sizes are >500 Å, said surface area is between about 150 and 450 m,/g and said pore volume is between about 0.4 and 1.2 cc/g.

4. The composition as claimed in claim 2 which after exposure to a temperature greater than about 1200° F. and steam, has pore sizes substantially between about 40 to 1000 Å in diameter, has surface area between about 100 and 300 m$^2$/g and has pore volume less or equal to 0.7 cc/g.

5. The composition as claimed in claim 1 wherein said cogelled, silica-alumina matrix is comprised of silica between 10 and 90% by weight.

6. The composition as claimed in claim 5 wherein said silica is between 45 and 65% by weight.

7. The composition as claimed in claim 6 wherein said silica is about 60% by weight.

8. The composition as claimed in claim 1 wherein said silica-alumina matrix is prepared by the method which comprises:
   (a) mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4;
   (b) slowly adding sufficient base with vigorous stirring, to said acidified silica sol/aluminum salt solution mixture to form a cogel slurry of silica and alumina, and to adjust said slurry to a pH in the range of about 5 to 9;
   c) aging said cogel slurry for up to about 3 hours at ambient to 95° C.;
   (d) adjusting the pH of said cogel slurry to about 5 to 9;
   (e) recovering a cogelled mass from said slurry; and
   (f) adding acid to adjust the pH to 4 to 7.

9. The composition as claimed in claim 8 wherein said base in step (b) comprises ammonium hydroxide.

10. The composition as claimed in claim 1 wherein said cogel matrix comprises between 20 and 90% of the composition by weight.

11. The composition as claimed in claim 10 wherein said cogel matrix comprises between 50 and 60% of the composition by weight.

12. The composition as claimed in claim 1 or 8 wherein said cogel matrix has a surface area of between about 200 and 450 m,/g, and a MAT activity of between about 20 and 80 wt. % conversion.

13. The composition as claimed in claim 12 wherein said cogel matrix has a MAT activity of between 45 and 80 wt. % conversion.

14. The composition as claimed in claim 8 wherein said cogel matrix is partially or totally ion-exchanged with polyvalent ions.

15. The composition as claimed in claim 14 wherein said cogel matrix is partially or totally ion-exchanged with rare earth ions.

16. The composition as claimed in claim 1 wherein said magnesium-containing clay is selected from the group consisting of attapulgite, sepiolite, hectorite, chrysotile, montmorillonite, saponite, chlorite, talc, smectite, vermiculite, and mica.

17. The composition as claimed in claim 16 wherein said clay is sepiolite.

18. The composition as claimed in claim 17 wherein said clay is Spanish sepiolite or a material of similar characteristics.

19. The composition as claimed in claim 1 wherein said clay comprises 40% or less of the composition by weight.

20. The composition as claimed in claim 19 wherein said clay comprises between 15 and 30% of the composition by weight.

21. The composition as claimed in claim 1 wherein said clay comprises an aqueous solution of said clay having a pH greater than about 7.

22. The composition as claimed in claim 21 wherein said clay is pretreated to reduce the amount of extraneous sodium or iron in the clay.

23. The composition as claimed in claim 1 wherein said faujasitic or Y-type zeolite comprises between 5 and 50% of the composition by weight.

24. The composition as claimed in claim 23 wherein said faujasitic or Y-type zeolite comprises between 20 and 40% of the composition by weight.

25. The composition as claimed in claim 24 wherein said zeolite is selected from the group consisting of:
(a) a low sodium, super stable Y-type zeolite having a unit cell constant of less than about 24.50 Å and an $Na_2O$ content of less than about 0.5% by weight,
(b) a low sodium, stabilized Y-type zeolite having a unit cell constant of less than 24.60 Å and an $Na_2O$ content of less than about 0.5% by weight, and
(c) a stabilized Y-type zeolite having a unit cell constant of less than 24.60 Å and an $Na_2O$ of less than about 3.0% by weight.

26. The composition as claimed in claim 25 wherein said zeolite is selected from the group consisting of LZ-Y20, LZ-Y82, and LZ-Y72.

27. The composition as claimed in claim 25 or 26 wherein said zeolite is partially or totally ion-exchanged with polyvalent ions.

28. The composition as claimed in claim 27 wherein said zeolite is partially or totally ion-exchanged with rare earth ions.

29. The composition as claimed in claim 28 wherein said zeolite is a low-sodium, ammonium Y-type zeolite having a cell constant less than 24.75 Å and a sodium content, as $Na_2O$, of less than 3.0% by weight, and which becomes stabilized under FCC reactor conditions.

30. The composition as claimed in claim 1 wherein said aging takes place at ambient temperature for a period of between 1 and 24 hours.

31. The composition as claimed in claim 1 wherein said aging takes place at a temperature $<95°$ C. for a period between about 1 and 3 hours.

32. The composition as claimed in claim 1 wherein said essentially spherical particles of said catalyst composition have an average particle size of from about 40 to 90 microns, a bulk density of from 0.4 to 0.9 g/cc, and are attrition resistant.

33. The composition as claimed in claim 32 wherein said average particle size is from 60 to 80 microns.

34. The composition as claimed in claim 1 wherein said particles are formed by spray-drying after homogenizing the slurry, preferably by passing said slurry through a colloid mill.

35. The composition as claimed in claim 34 wherein said particles which are formed by spray-drying are exchanged with polyvalent ions subsequent to spray-drying.

36. The composition as claimed in claim 35 wherein said particles are exchanged with rare earth ions subsequent to spray-drying.

37. The composition as claimed in claims 1, 8, 16, and 23, further comprising an inorganic oxide selected from the group consisting of Group III, IV, and V metal oxides and mixtures thereof.

* * * * *